(12) United States Patent
Sugaya

(10) Patent No.: US 7,606,488 B2
(45) Date of Patent: Oct. 20, 2009

(54) WAVELENGTH-DIVISION-MULTIPLEXING OPTICAL TRANSMISSION SYSTEM AND CONTROL METHOD THEREOF

(75) Inventor: Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 11/529,332

(22) Filed: Sep. 29, 2006

(65) Prior Publication Data

US 2007/0269215 A1    Nov. 22, 2007

(30) Foreign Application Priority Data

May 19, 2006    (JP)    ............... 2006-139820

(51) Int. Cl.
*H04B 10/08*    (2006.01)

(52) U.S. Cl. .............. 398/34; 398/33; 398/38; 398/95; 398/94; 398/97; 398/177; 398/181; 398/160; 398/18; 359/337; 359/341.41; 359/341.42; 330/59; 330/308; 385/24; 385/37; 385/122

(58) Field of Classification Search .......... 398/34, 398/79, 83, 94, 92, 25, 26, 27, 30, 31, 33, 398/37, 38, 147, 157, 158, 159, 160, 173, 398/177, 180, 181, 18, 97, 95; 359/337, 359/341, 341.41, 341.42; 330/59, 308; 385/24, 385/37, 122

See application file for complete search history.

(56) References Cited

U.S. PATENT DOCUMENTS

| | | | |
|---|---|---|---|
| 6,025,947 A | * | 2/2000 | Sugaya et al. ............ 398/97 |
| 6,038,063 A | | 3/2000 | Tsuda et al. |
| 6,157,481 A | | 12/2000 | Sugaya et al. |
| 6,198,572 B1 | * | 3/2001 | Sugaya et al. ............ 359/337 |
| 6,903,324 B2 | | 6/2005 | Tomofuji et al. |

FOREIGN PATENT DOCUMENTS

| | | |
|---|---|---|
| JP | 11-121848 | 4/1999 |
| JP | 2000-201111 | 7/2000 |
| JP | 2000-312046 | 11/2000 |

* cited by examiner

*Primary Examiner*—Hanh Phan
(74) *Attorney, Agent, or Firm*—Staas & Halsey LLP

(57) ABSTRACT

In a wavelength-division-multiplexing optical transmission system in which optical-node apparatuses that perform relay transmission of wavelength-division-multiplexed light are located at specified nodes in a main optical transmission path, an optical amplifier switches level control to constant-gain control when there is a notification of a change in the number of multiplexed wavelengths, and then after a specified amount of time restarts level control so that the level becomes a target level that corresponds to the actual number of wavelengths. When doing this, an optical-transmission-system-control unit controls the optical-transmission system so that the equation $$T < Y/(N \cdot v)$$

is satisfied, wherein T denotes a period from the time when a change in the number of multiplexed wavelengths occurs until said constant-gain control starts v denotes output-level-recovery speed of the optical amplifier, Y denotes fluctuation allowance of a receiving unit after wavelength-division-multiplexing transmission, and N is a maximum number of spans.

12 Claims, 13 Drawing Sheets

FIG. 11
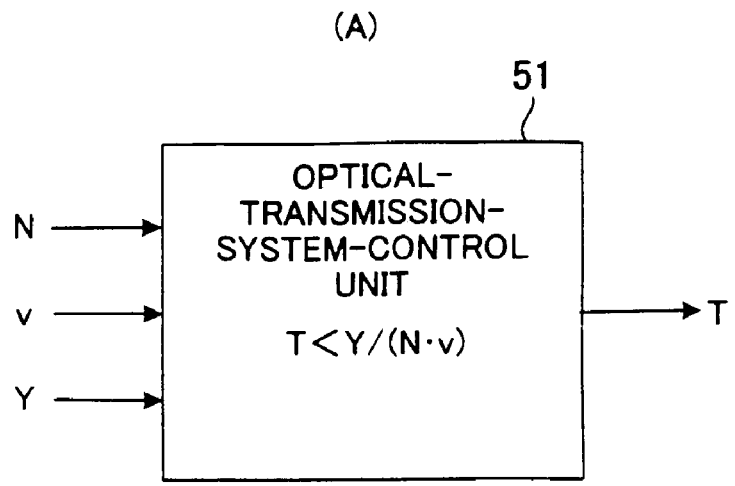
(A)
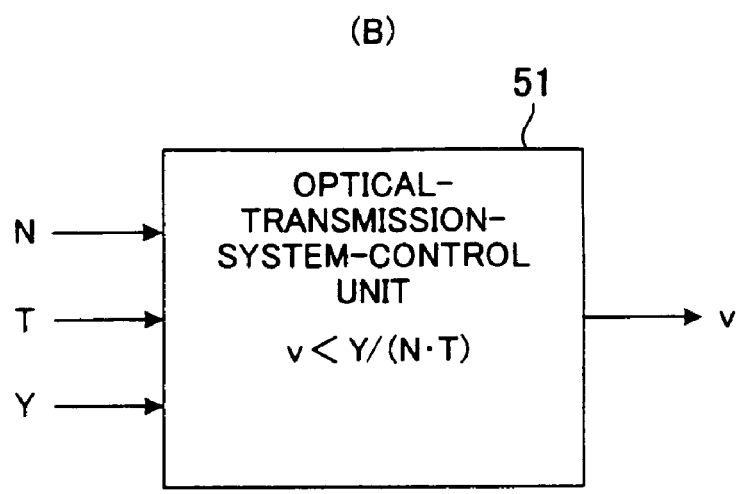
(B)
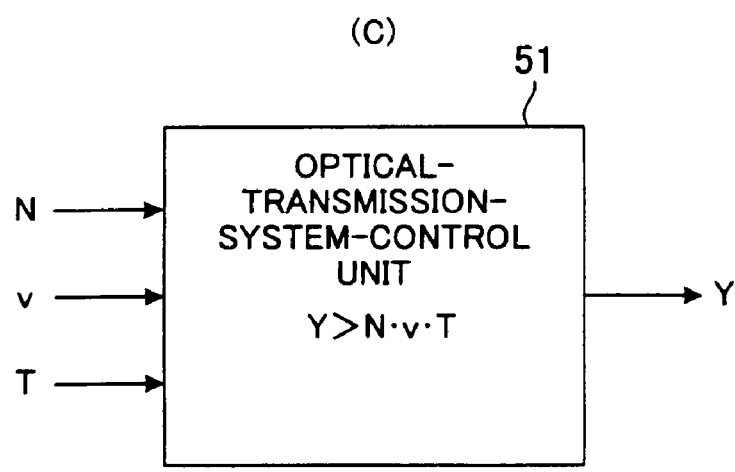
(C)

WAVELENGTH-DIVISION-MULTIPLEXING OPTICAL TRANSMISSION SYSTEM AND CONTROL METHOD THEREOF

BACKGROUND OF THE INVENTION

This invention relates to a wavelength-division-multiplexing optical transmission system and control method thereof, and particularly to a wavelength-division-multiplexing optical transmission system and control method thereof that comprises an optical-node apparatus that controls the optical level based on the number of multiplexed wavelengths, Wavelength-division-multiplexing (WDM) optical transmission that multiplexes a plurality of optical signals having different wavelengths in one optical fiber is a very effective method for performing a large volume of optical fiber communication. In the mainline of the wavelength-division-multiplexing optical transmission system, constant optical gain control is performed for the optical amp for prioritizing the level evenness characteristic of a wavelength. By performing this constant-optical-gain control it is possible to control the power per one wavelength (one channel) to be a fixed value even when the number of multiplexed wavelengths (number of channels) changes.

(A) of FIG. 14 shows the construction of part of the mainline of a wavelength-division-multiplexing optical transmission system that uses an optical amp for performing this kind of constant-optical-gain control. In the mainline of the wavelength-division-multiplexing optical transmission system, the transmission path is connected in a ring shape, and optical add/drop multiplexers (OADM) 1a, 1b are located at suitable locations. The OADM multiplexes data that is input from a user terminal (not shown in the figure) onto the optical signal of the mainline, and transmits it, or splits the multiplexed optical signal of the mainline and extracts data for a user and transmits it to the user terminal. A post amp 2a, 2b that performs constant-optical-gain control is connected to the output side of each OADM 1a, 1b, a pre amp 3a, 3b that performs constant-optical-gain control is connected to the input side of each OADM 1a, 1b, and an optical transmission path 4 is connected between the post amp 2a and pre amp 3b. By using an optical amp for performing constant-optical-gain control in this way, it is possible to even out the wavelength characteristic, however, as shown in (B) of FIG. 14, it is not possible to handle the fluctuation in the pre-amp output level (OADM input level) caused by the fluctuation of transmission-path loss La, Lb, Lc.

Therefore, while maintaining a wavelength-evenness function, it further becomes necessary to have a level-control function for quickly making the output level of the amp constant when level fluctuation occurs. Therefore, an optical-transmission system has been proposed as a first prior art that comprises an optical amplifier having a constant-optical-gain-control function and level-control function, in which the optical amplifier normally performs constant-gain control, and at a constant period performs level control (refer to JP11-121848A). Also, as shown in (A) of FIG. 15, an optical-transmission system has been proposed that has a constant-optical-gain-control function and constant-level-control function in the pre amp 3b. In (A) of FIG. 15, the same reference numbers are given to parts that are identical to those in (A) of FIG. 14.

As shown in (B) of FIG. 15, according to the optical amplifiers of the prior art, even when there is loss fluctuation La, Lb, Lc in the transmission path, it is possible to maintain the output of the pre amp 3b, or in other words, it is possible to keep the input level to the OADM constant.

In wavelength-division-multiplexing optical transmission, when the number of wavelengths (number of channels) that are multiplexed changes, the optical power of the multiplexed wavelengths changes, and thus the optical-input level to the optical amplifier changes. However, in the prior constant-level control shown in FIG. 15, it is not determined whether the fluctuation in the optical-input level is due to a change in the number of channels, or due to loss fluctuation of the transmission path. Therefore, in the prior constant-level control, control is performed to bring the output level to a set level even when the number of multiplexed wavelengths (number of channels) decreases, and thus the input level becomes low, so the output level per wave becomes too large, and signal-transmission error occurs. Also, in the prior constant-level control, control is performed to keep the output level constant even when the number of channels increases, so the output level per wave becomes low and signal-transmission error occurs.

Therefore, a control method for a wavelength-division-multiplexing optical transmission system has been proposed as a second prior art in which level control is performed according to the number of channels, and constant-gain control is performed temporarily only when there is a notification that the number of channels has changed, and after that constant-level control is performed according to the number of channels after the change (see JP2000-20111A).

According to this second prior art, a certain amount of time T is required from the time that the number of channels actually changes until constant-gain control starts. During this time T, the optical amplifier of this second prior art controls the output level so that it is at a level that corresponds to the number of channels before a change in channels. In this case, when the time T is long, or when the level-recovery speed of the optical amplifier is fast, the output level during that time T becomes a value that is quite far from the proper level that corresponds to the actual number of channels. For example, when the number of channels decreases, the output level becomes a value that is quite larger than the proper level, and when the number of channels increases, the output level becomes a value that is quite lower than the proper level. Therefore, during the period until level control starts according to the actual number of channels, and particularly, during the period that constant-gain control is performed, signal-transmission error occurs.

SUMMARY OF THE INVENTION

Taking the above into consideration, the object of the present invention is to keep the difference between the output level of the optical amplifier and the proper level that corresponds to the actual number of channels when a change in the number of channels occurs within a range in which signal-transmission error does not occur, even when level control is performed in addition to constant-gain control.

Taking into consideration the fluctuation allowance of the overall transmission system, another object of the present invention is to keep a period T from the time when the number of channels actually changes until constant-gain control is performed, or the level-recovery speed v of the optical amplifier at a value so that signal-transmission error does not occur when the number of channels changes.

A first aspect of the present invention is a wavelength-division-multiplexing optical transmission system in which optical-node apparatuses that perform relay transmission of wavelength-division-multiplexed light are located at specified nodes in a main optical transmission path. This wavelength-division-multiplexing optical transmission system comprises the following at each node: a multiplexed-wavelength-number monitoring unit that monitors the number of multiplexed wavelengths; a multiplexed-wavelength-number transmission unit that transmits the number of multiplexed wavelengths in the downstream direction; and an optical amplifier that is located at a stage before the optical-node apparatus and that switches level control to constant-gain control when there is notification from upstream of a change in the number of multiplexed wavelengths, and after a specified amount of time, restarts level control so that the level becomes a target level that corresponds to the actual number of multiplexed wavelengths; and further comprises an optical-transmission-system-control unit that performs control so that the equation $$T < Y/(N \cdot v)$$

is satisfied, wherein T denotes a period from the time when a change in the number of multiplexed wavelengths occurs until the constant-gain control starts v denotes output-level-recovery speed of the optical amplifier, Y denotes fluctuation allowance of a receiving unit after wavelength-division-multiplexing transmission, and N denotes a maximum number of spans.

The optical-transmission system control unit determines the period T based upon the output-level-recovery speed v of the optical amplifier, the fluctuation allowance Y of the receiving unit after wavelength-division-multiplexing transmission, and the maximum number of spans N; or the optical-transmission-system-control unit determines the output-level-recovery speed v of the optical amplifier based upon the period T from the time when a change in the number of multiplexed wavelengths occurs until the constant-gain control starts, the fluctuation allowance Y of the receiving unit after wavelength-division-multiplexing transmission, and the maximum number of spans N.

The multiplexed-wavelength-number transmission unit uses a monitoring-signal light having a wavelength different from a main-signal light to transmit the number of multiplexed wavelengths in the downstream direction; or the multiplexed-wavelength-number transmission unit overlaps a low-frequency signal onto a main signal light, and uses that low-frequency signal to transmit the number of multiplexed wavelengths in the downstream direction.

The multiplexed-wavelength-number monitoring unit is located inside the optical-node apparatus, and the multiplexed-wavelength-number transmission unit transmits the number of multiplexed wavelengths to said optical amplifier of a downstream node; or another optical amplifier that performs constant-gain control is located at a stage after the optical-node apparatus, and the multiplexed-wavelength-number monitoring unit is located on the output side of said another optical amplifier, and the multiplexed-wavelength-number transmission unit transmits the number of multiplexed wavelengths to the optical amplifier of a downstream node.

A second aspect of the invention comprises: a step of monitoring the number of multiplexed wavelengths; a step of transmitting that number of multiplexed wavelengths in the downstream direction; a step of switching level control to constant-gain control when there is notification from upstream of a change in the number of multiplexed wavelengths, and then after a specified amount of time restarting level control so that the equation $$T < Y/(N \cdot v)$$

is satisfied, wherein T denotes a period from the time when a change in the number of multiplexed wavelengths occurs until the constant-gain control starts v denotes output-level-recovery speed of the optical amplifier, Y denotes fluctuation allowance of a receiving unit after wavelength-division-multiplexing transmission, and N denotes a maximum number of spans.

According to this invention, the optical transmission system is controlled so that the equation $$T < Y/(N \cdot v)$$

is satisfied, wherein T denotes a period from the time when a change in the number of multiplexed wavelengths occurs until the constant-gain control starts v denotes output-level-recovery speed of the optical amplifier, Y denotes fluctuation allowance of a receiving unit after wavelength-division-multiplexing transmission, and N denotes a maximum number of spans, so it is possible to keep the difference between the actual output from the optical amplifier when there is a change in the number of multiplexed wavelengths and the proper level that corresponds to the number of multiplexed wavelengths within a range so that signal-transmission error does not occur.

According to this invention, by taking into consideration the fluctuation allowance of the overall transmission system, it is possible to determine a period T from the time when a change in the number of multiplexed wavelengths occurs until constant-gain control starts, or the output-level-recovery speed v, so it is possible to prevent signal-transmission error from occurring when there is a change in the number of multiplexed wavelengths.

According to this invention, a channel monitor that is located inside the optical-node apparatus beforehand is used to monitor the number of multiplexed wavelengths, so construction is simple.

According to this invention, the number of multiplexed wavelengths at an upstream node is monitored, and using a monitoring-signal light having a wavelength that differs from a main signal light, or a low-frequency signal, it is possible to transmit the number of multiplexed wavelengths very quickly to a downstream pre amp. Therefore, it is possible to construct an optical transmission system that is able to satisfy the equation above.

Other features and advantages of the present invention will be apparent from the following description taken in conjunction with the accompanying drawings.

BRIEF DESCRIPTION OF THE DRAWINGS

FIG. 11 is a drawing explaining control for deciding parameters for the optical-transmission-system-control unit that decides the parameters T, v, Y of an optical transmission system and controls all of the units such as the pre amp based on those parameters.

DESCRIPTION OF THE PREFERRED EMBODIMENTS

Figure 1:
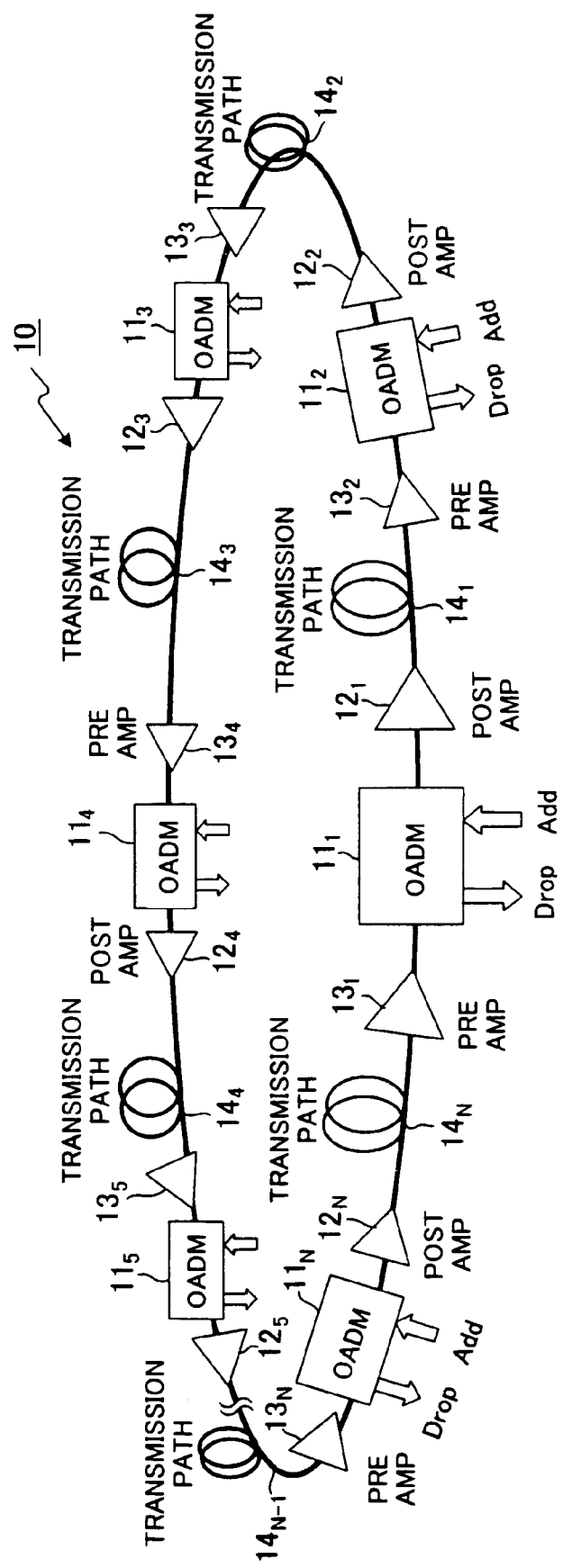
FIG. 1 is a drawing showing the construction of a wavelength-division-multiplexing optical transmission system to which the present invention can be applied.

FIG. 1 is a drawing of a wavelength-division-multiplexing optical transmission system to which the present invention can be applied, and in that system N number of optical-node apparatuses (OADM) $11_1, 11_2, \ldots, 11_N$ that perform relay transmission of wavelength division multiplexed light (WDM signal light) are placed at appropriate locations (nodes) along the main optical transmission path 10. The main optical transmission path 10 is constructed so that it is ring shaped; therefore, by defining the space between adjacent OADM as a span, the number of spans and the number of OADM is the same, so there is N number of spans.

Each OADM $11_1, 11_2, \ldots, 11_N$ multiplexes data that is input from user terminals (not shown in the figure) under it on to the WDM signal light on the main optical transmission path 10 and transmits it (Add), or separates and extracts data for a user under it from the WDM signal light on the main optical transmission path 10 and transmits it to the user terminal (Drop). A post amp $12_1, 12_2, \ldots, 12_N$ that performs constant-gain control is connected to the output side of each OADM $11_1, 11_2, \ldots, 11_N$, a pre amp $13_1, 13_2, \ldots, 13_N$ that performs constant-gain control and level control is connected to the input side of each OADM $11_1, 11_2, \ldots, 11_N$, and a transmission path $14_1, 14_2, \ldots, 14_N$ is connected between these post amps and pre amps.

The pre amps $13_1, 13_2, \ldots, 13_N$ normally perform level control so that the level is the output level that corresponds to the actual number of multiplexed wavelengths (number of channels), and switch to constant-gain control when notified of a change in the number of channels, and after a specified amount of time, restarts level control so that the level becomes the target level that corresponds to the notified actual number of channels.

Figure 2:
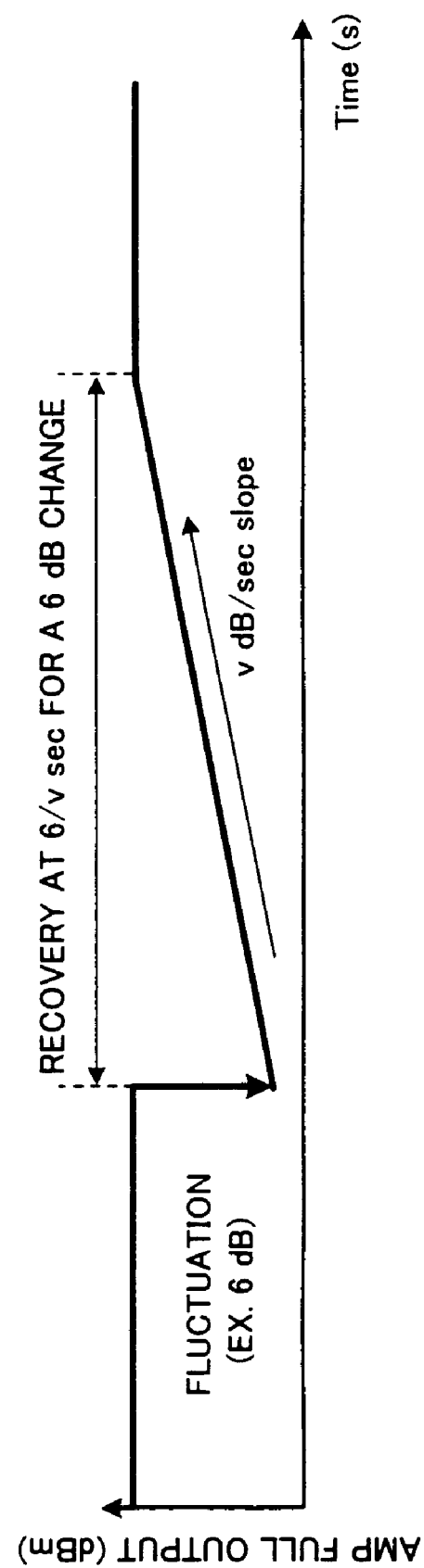
FIG. 2 is a drawing for explaining the output level restoration speed v (dB/sec) of a pre amp when the level changes 6 dB, for example, due to loss fluctuation in the transmission path.

FIG. 2 is a drawing for explaining the output-level-recovery speed v (dB/sec) of all pre amps when the level changes 6 dB, for example, in the entire optical-transmission path due to loss fluctuation in the transmission path, wherein the output level of the pre amp will return to a predetermined level after 6/v(sec).

Figure 3:
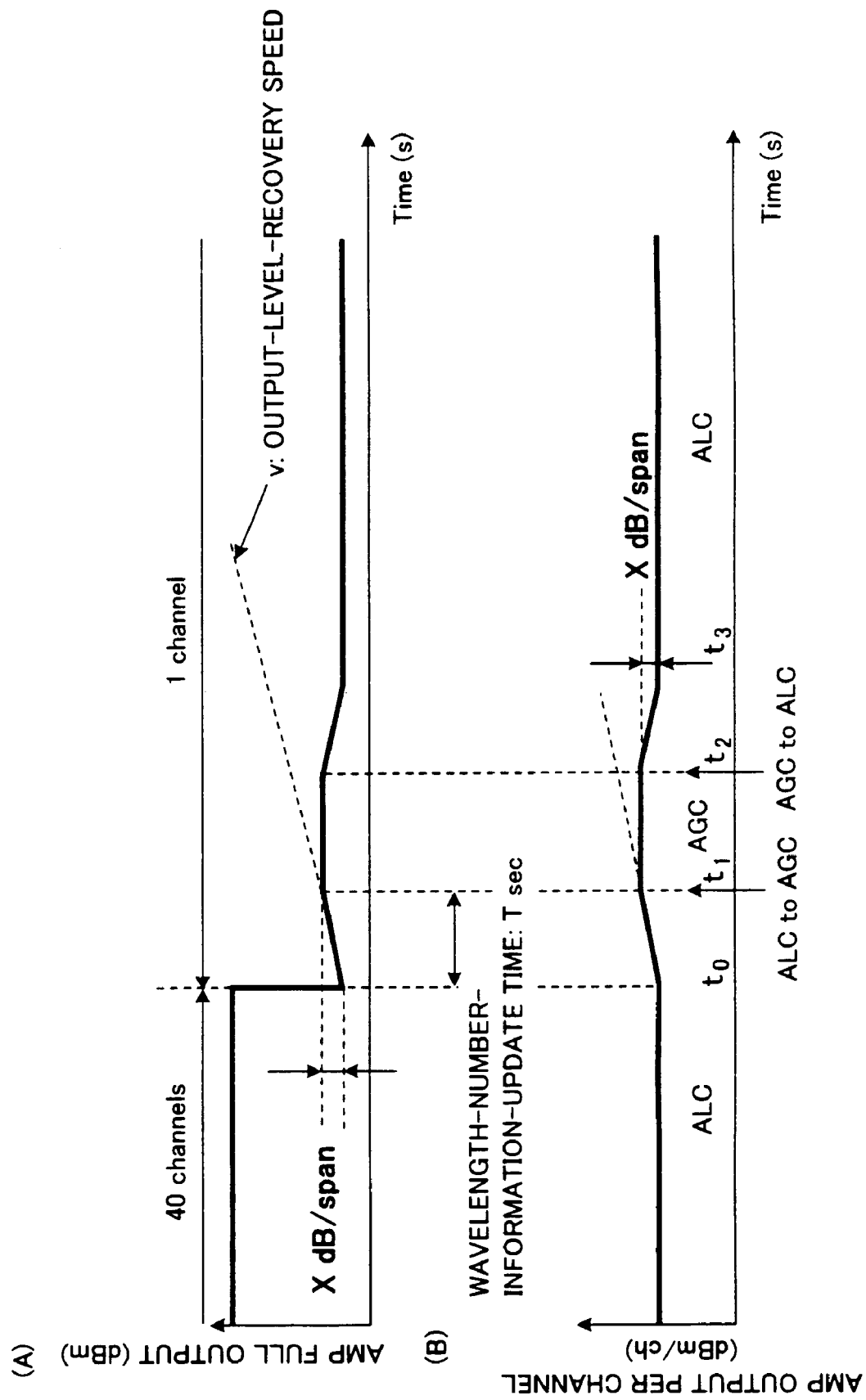
FIG. 3 is a drawing for explaining the operation of a pre amp when the number of channels changes from 40 channels to 1 channel due to fluctuation in the number of channels.

FIG. 3 is a drawing for explaining the operation of the pre amp when the number of channels changes at time to, for example, from 40 channels to 1 channel due to fluctuation in the number of channels, where (A) of FIG. 3 is a drawing for explaining the operation of all amps in the optical-transmission path, and (B) is a drawing for explaining the operation of one pre amp. Each pre amp $13_1, 13_2, \ldots, 13_N$ performs level control (ALC: Automatic Level Control) until the time t1 when there is a notification of a change in the number of channels, and then when there is a notification of a change in the number of channels, switches to constant-gain control (AGC: Automatic Gain Control). Also, after a specified amount of time, for example, at time t2, when the actual number of channels has been notified, starts performing level control (ALC) again so that the level becomes the target level corresponding to the notified actual number of channels.

Figure 4:
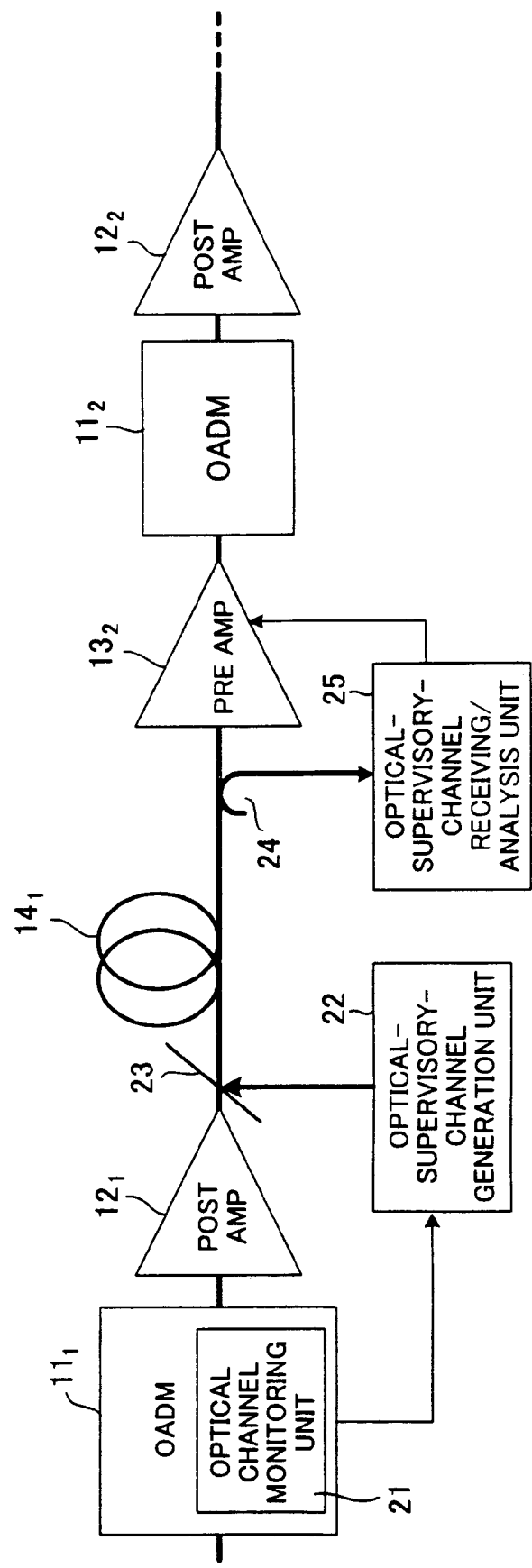
FIG. 4 is a drawing for explaining the method of monitoring fluctuation in the number of channels and notifying a pre amp at a downstream node of the change.

FIG. 4 is a drawing for explaining the mechanism for monitoring change in the number of channels, and notifying a pre amp at a downstream node, and shows an enlarged view of the first span section in FIG. 1. An optical channel monitoring unit 21 is located in each OADM $11_1, 11_2$ (the figure shows only the optical channel monitoring unit 21 for OADM $11_1$). The optical channel monitoring unit 21 monitors the number of multiplexed wavelengths (number of channels) of wavelength-division-multiplexed light (WDM signal light) output from the OADM $11_1$, and notifies an optical-supervisory-channel generation unit 22 of the channel-number change and the number of channels. The optical-supervisory-channel generation unit 22 generates a supervisory-signal light having a different wavelength than the main signal light, and modulates that supervisory-signal light based on the channel-number-change data and the channel-number data, and an optical multiplexer 23 combines the main-signal light that is output from the post amp $12_1$ with the supervisory-signal light, and transmits the result to the optical-transmission path $14_1$.

An optical coupler 24 at a downstream node divides off part of the WDM signal light, and inputs it to an optical-supervisory-channel receiving/analysis unit 25. The optical-supervisory-channel receiving/analysis unit 25 demodulates the supervisory-signal light, and identifies the channel-number change and number of channels, and inputs that data to the pre amp $13_2$ located before the OADM $11_2$. When this data has been input, the pre amp $13_2$ performs level control (ALC) and constant-gain control (AGC) according to the sequence explained in FIG. 3.

Figure 5:
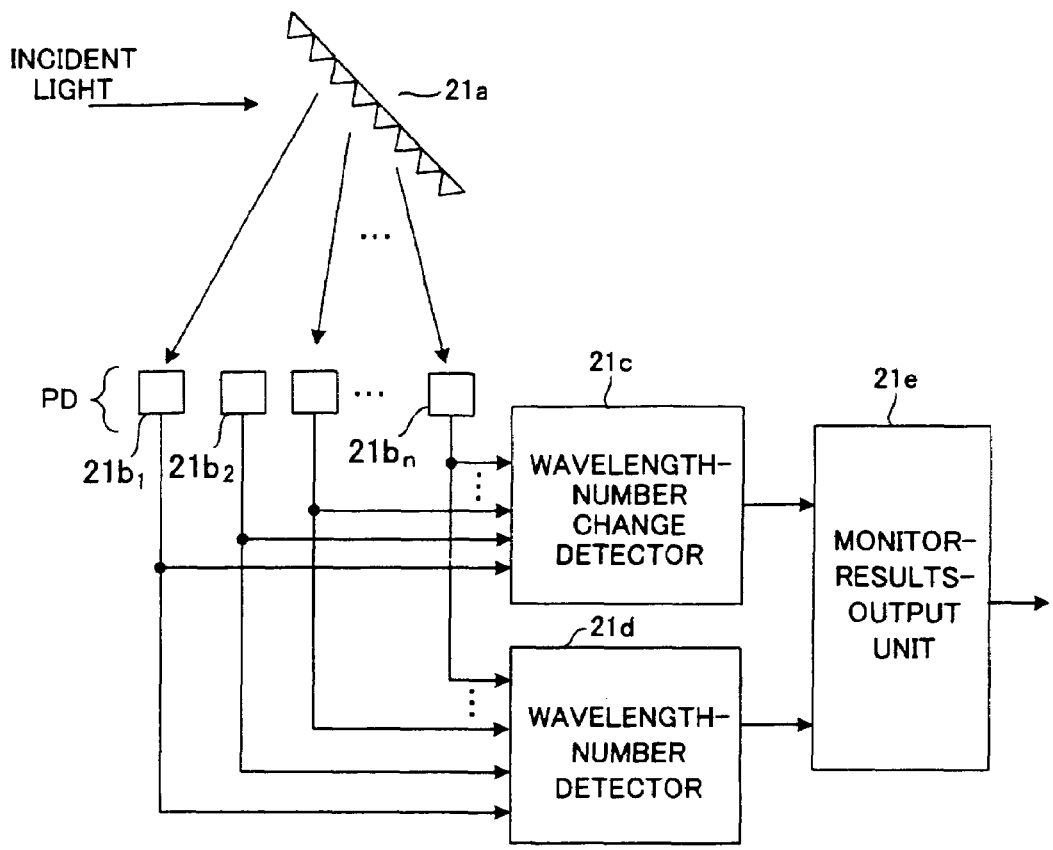
FIG. 5 is a drawing showing the construction of an optical channel monitoring unit.

FIG. 5 is a drawing showing the construction of the optical channel monitoring unit 21, where a diffraction grate (grating) 21a separates wavelengths that are contained in the WDM signal light, which is the incident light, and photodetectors $21b_1, 21b_2, \ldots, 21b_n$ that correspond with the wavelengths detect the light of the separated wavelengths and input the light to a wavelength-number change detector 21c and wavelength-number detector 21d. The wavelength-number change detector 21c detects that the number of wavelengths has changed, and the wavelength-number detector 21d counts the number of wavelengths (number of channels) after the change, and a monitor-result-output unit 21e inputs these results to the optical-supervisory-channel generation unit 22.

Figure 6:
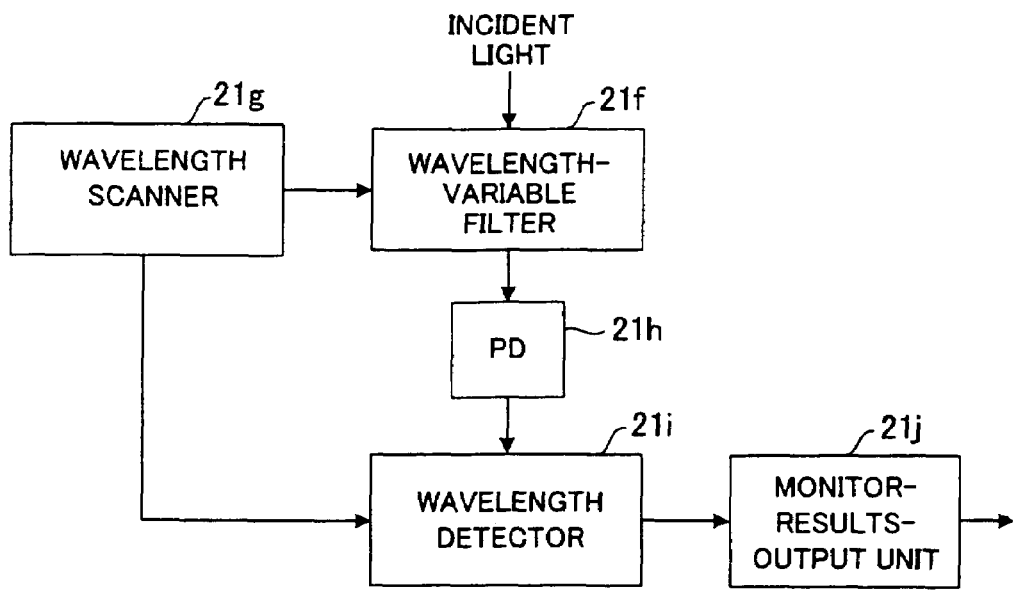
FIG. 6 is another drawing showing the construction of an optical channel monitoring unit.

FIG. 6 is another drawing showing the construction of the optical channel monitoring unit 21, where WDM signal light is input to a wavelength-variable filter (tunable filter) 21f. The wavelength-variable filter 21f selectively outputs light of each wavelength contained in the WDM signal light according to scanning results by a wavelength scanner 21g; a photodetector 21h detects the light of the wavelengths output from the wavelength-variable filter 21f; a wavelength-number detector 21*i* counts the number of wavelengths of the light detected by the photodetector 21*h*, and a monitor-result-output unit 21*j* inputs the result that the number of wavelengths (number of channels) has changed and the number of channels to the optical-supervisory-channel generation unit 22.

Figure 7:
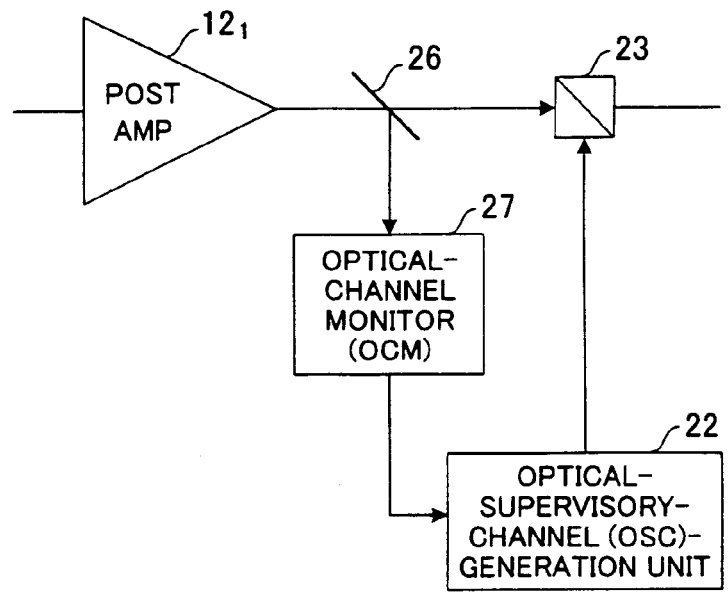
FIG. 7 is another drawing showing the arrangement of an optical channel monitoring unit

As described above, the optical channel monitoring unit 21 is located inside the OADM, however, as shown in FIG. 7, construction is also possible in which an optical coupler 26 and optical-channel monitor 27 are located on the output side of the post amp $12_1$, and these detect a change in the number of channels and the number of channels, and input the results to the optical-supervisory-channel generation unit 22.

Figure 8:
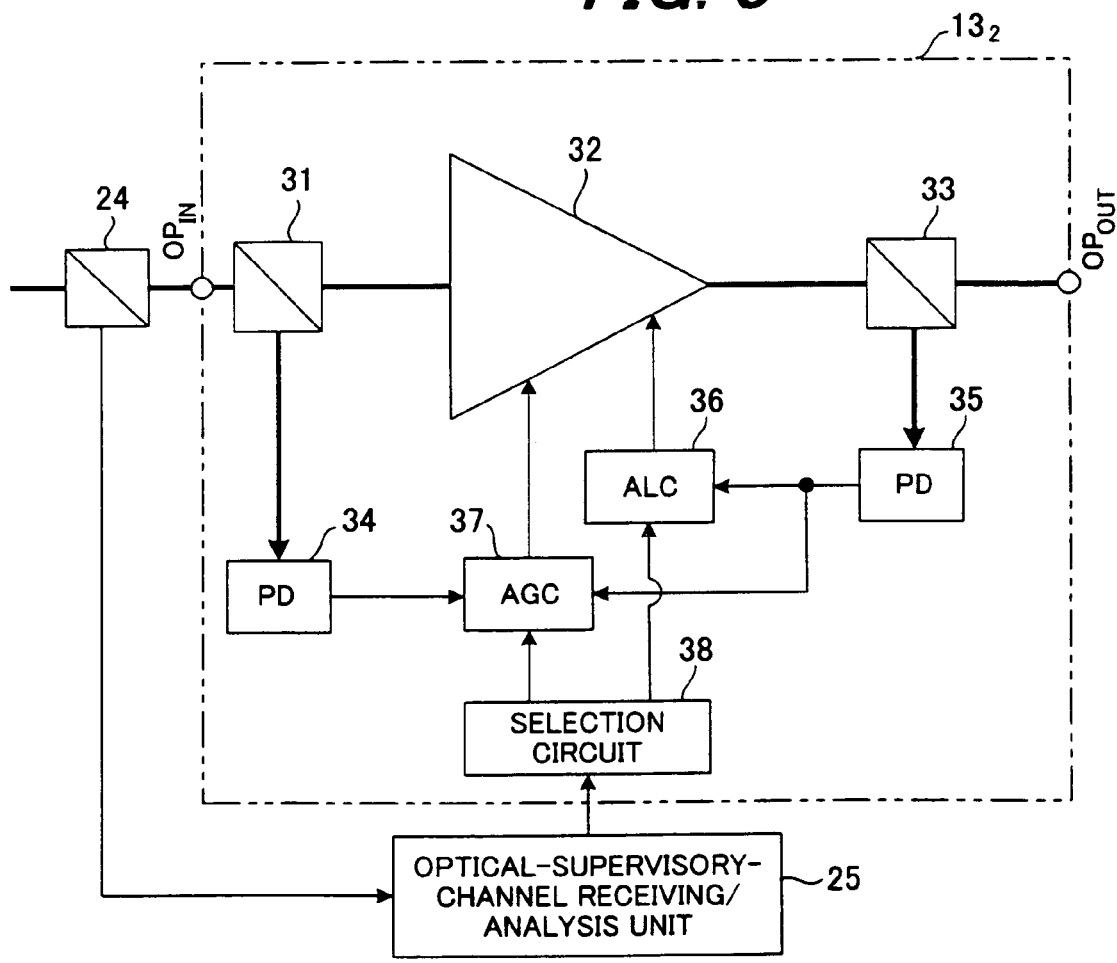
FIG. 8 shows an example of the construction of a pre amp.

FIG. 8 shows an example of the construction of the pre amp $13_2$, where an optical coupler 31, optical-amplifier unit 32 and optical coupler 33 are located in order between the input port $OP_{IN}$ and output port $OP_{OUT}$. Part of the WDM signal light that is supplied to the input port $OP_{IN}$ is branched off by the optical coupler 31, and the remaining light is supplied to the optical-amplifier unit 32. A photodetector 34 comprising a photodiode and the like converts the light that is branched off by the optical coupler 31 to an electrical signal that corresponds to its power. The optical-amplifier unit 32 amplifies the supplied WDM signal light. The optical coupler 33 branches off part of the WDM signal light, and the remaining is output from the output port $OP_{OUT}$. A photodetector 35 converts the light that was branched off by the optical coupler 33 to an electric signal that corresponds to its power.

An ALC (auto output level control) circuit 36 detects the output level of the optical-amplifier unit 32 based on the electric signal from the photodetector 35, and controls the optical amplifier unit 32 so that the output level becomes the target level that corresponds to the number of channels. An AGC (auto gain control) circuit 37 detects the gain of the optical-amplifier unit 32 based on the electrical signals from the photodetectors 34 and 35, and controls the optical amplifier unit 32 so that the gain becomes constant. More specifically, the AGC circuit 37 controls the optical-amplifier unit 32 so that the level ratio or level difference of the electrical signals from the photodetectors 34 and 35 become constant. A selection circuit 38 alternatively switches between the ALC circuit 36 and AGC circuit 37 according to the sequence explained in FIG. 3 based on the channel-number change and number of channels input from the optical-supervisory-channel receiving/analysis unit 25, and performs level control and constant-gain control.

Figure 9:
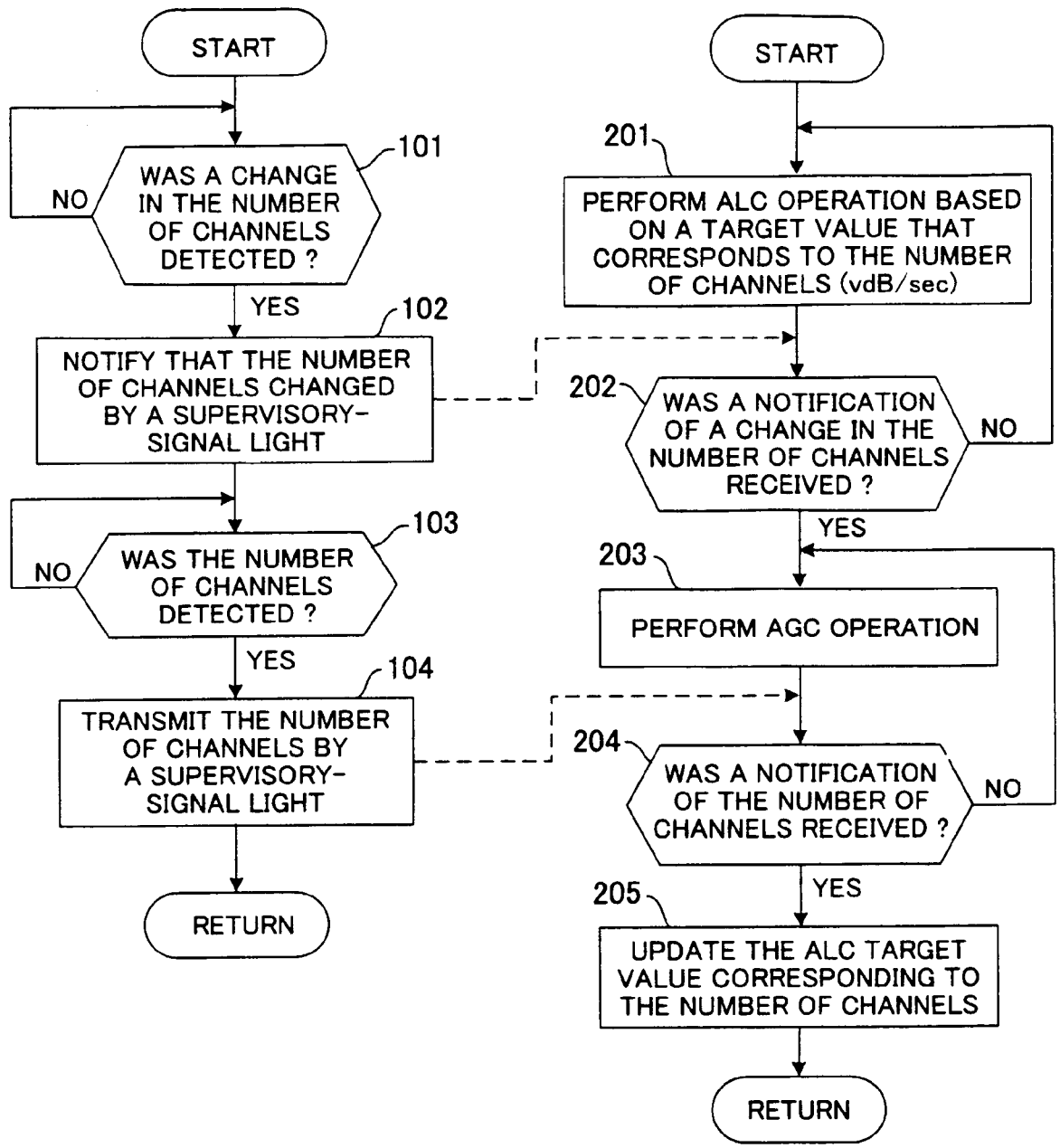
FIG. 9 is a flowchart showing the channel monitor and flow of level/gain control processing.

FIG. 9 is a flowchart showing the channel monitoring and level/gain control processing.

The optical channel monitoring unit 21 (see FIG. 4) monitors whether the number of channels has changed (step 101), the pre amp $13_2$ performs level control (ALC) based on the target level that corresponds to the actual number of channels (step 201), and monitors whether there is a notification of a change in the number of channels (step 202).

In that state, when the optical channel monitoring unit 21 detects that number of channels has changed, it notifies the pre amp $13_2$ of that change using a supervisory-signal light (Optical Supervisory Channel: OSC) (step 102), and then monitors whether the number of channels has been detected (step 103). When the pre amp $13_2$ is notified of the change in the number of channels, it switches from performing level control (ALC) to constant-gain control (AGC) (step 203), and monitors whether a notification of the number of channels has been received (step 204).

When the optical channel monitoring unit 21 detects the number of channels, it notifies the pre amp 132 of the number of channels using a supervisory-signal light (step 104), then returns to the start of the process. When the pre amp $13_2$ receives the number of channels, it starts performing level control (ALC) again based on the target level that corresponds to that number of channels (step 205), and returns to the start of the process.

Figure 10:
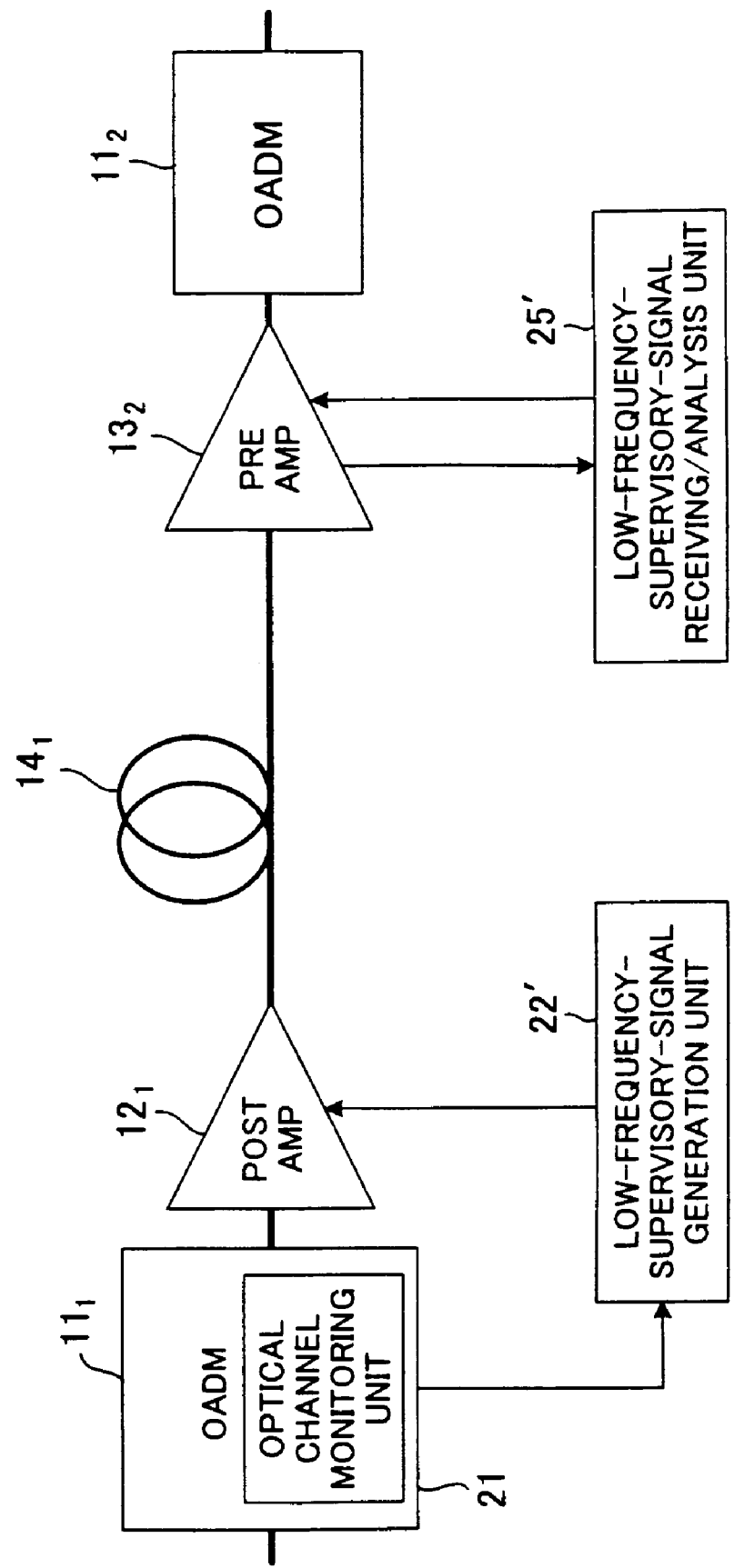
FIG. 10 shows an example of using a low-frequency signal to perform notification of a change in the number of channels and the number of channels.

The case of notifying of a change in the number of channels and the number of channels using a supervisory-signal light (Optical Supervisory Channel: OSC) that has a different wavelength than the main signal was described above, however, it is also possible to perform notification using a low-frequency signal. FIG. 10 is a drawing showing the construction in that case, where the same reference numbers are given to parts that are the same as those in FIG. 4. This case differs in that instead of the optical-supervisory-channel generation unit 22 and optical-supervisory-channel receiving/analysis unit 25, there is a low-frequency-supervisory-signal generation unit 22' and a low-frequency-supervisory-signal receiving/analysis unit 25', and a low-frequency signal is overlapped on the main-signal light, and a change in the number of channels and the number of channels is transmitted using that low-frequency signal.

However, when the difference between the target level that corresponds to the number of channels and the actual output level is greater than a set value, the probability that a signal-transmission error will occur becomes high. Therefore, it is necessary to perform control so that the level difference is less than the set value. This point will be considered with reference to FIG. 3.

By taking a period from the time t0 when the number of channels is actually changed to the time t1 when the change in the number of channels was notified to be T (wavelength information update time)(sec), and the level-recovery speed per span for each pre amp to be x (dB/span), the output level of each pre amp increases x (dB/span) during this wavelength-information-update time T. However, after that, the pre amps switch from level control to constant-gain control, so the level stops increasing. Also, at time t2, level control is restarted according to the actual number of channels, and due to this the output level decreases.

From the above it can be seen that during the period of constant-gain control t1 to t2 after the number of channels changes, the output level of each pre amp becomes a level that is separated from the proper output level by x (dB/span). This level difference becomes larger the longer the wavelength-information-update time T is, and the faster the output-level-recovery speed v of each pre amp is, and when that level difference x becomes greater than a value that is set based on the fluctuation allowance Y of a receiving unit after wavelength-division-multiplexing transmission, the probability that a signal-transmission error will occur increases. The receiving unit is a receiving apparatus that connects to a drop destination (user terminal) of the optical node apparatus (OADM) to deliver user data for example, and the fluctuation allowance is a degree of the allowance beyond which a signal-transmission error occurs, and when the difference between the target level and the actual output level is less than that fluctuation allowance, a signal-transmission error will not occur, and when the difference is greater than that fluctuation allowance, a signal-transmission error will occur. When the maximum number of optical node apparatuses that can be set, or in other words, the maximum number of spans that can be set is taken to be N, the fluctuation allowance per span becomes Y/N.

From the above, by taking a period from the time when the number of multiplexed wavelengths changes until constant-gain control starts to be T, the output-level-recovery speed of the pre amp to be v, the fluctuation allowance of the receiving unit after the wavelength-division-multiplexing transmission to be Y and the maximum number of spans to be N, it is necessary to construct the optical-transmission system so that the following equation is satisfied.

$$T \cdot v < Y/N \quad (1)$$

FIG. 11 is a drawing explaining parameter-setting control of an optical-transmission-system-control unit 51 that decides each of the aforementioned parameters T, v, Y of the optical-transmission system, and controls each of the units such as the pre amps based on those parameters.

(A) of FIG. 11 shows the case where the output-level-recovery speed v of the pre amp, the fluctuation allowance Y of the receiving unit after wavelength-division-multiplexing transmission, and the maximum number of spans N are given, and the optical-transmission-system-control unit 51 uses these parameters to decide the period T from the time when the number of multiplexed wavelengths changes until constant-gain control starts so that it satisfies the following equation.

$$T < Y/(N \cdot v) \quad (2)$$

(B) of FIG. 11 shows the case where the period T from the time when the number of multiplexed wavelengths changes until constant-gain control starts, the fluctuation allowance Y of the receiving unit after wavelength-division-multiplexing transmission, and the maximum number of spans N are given, and the optical-transmission-system-control unit 51 uses these parameters to decide the output-level-recovery speed v of the pre amp so that it satisfies the following equation.

$$v < Y/(N*T) \quad (3)$$

(C) of FIG. 11 shows the case where the output-level-recovery speed v of the pre amp, the maximum number of spans N, and the period T from the time when the number of multiplexed wavelengths changes until constant-gain control starts are given, and the optical-transmission-system-control unit 51 uses these parameters to decide the fluctuation allowance Y of the receiving unit after wavelength-division-multiplexing transmission so that it satisfies the following equation.

$$Y > N \cdot T \cdot v \quad (4)$$

Figure 12:
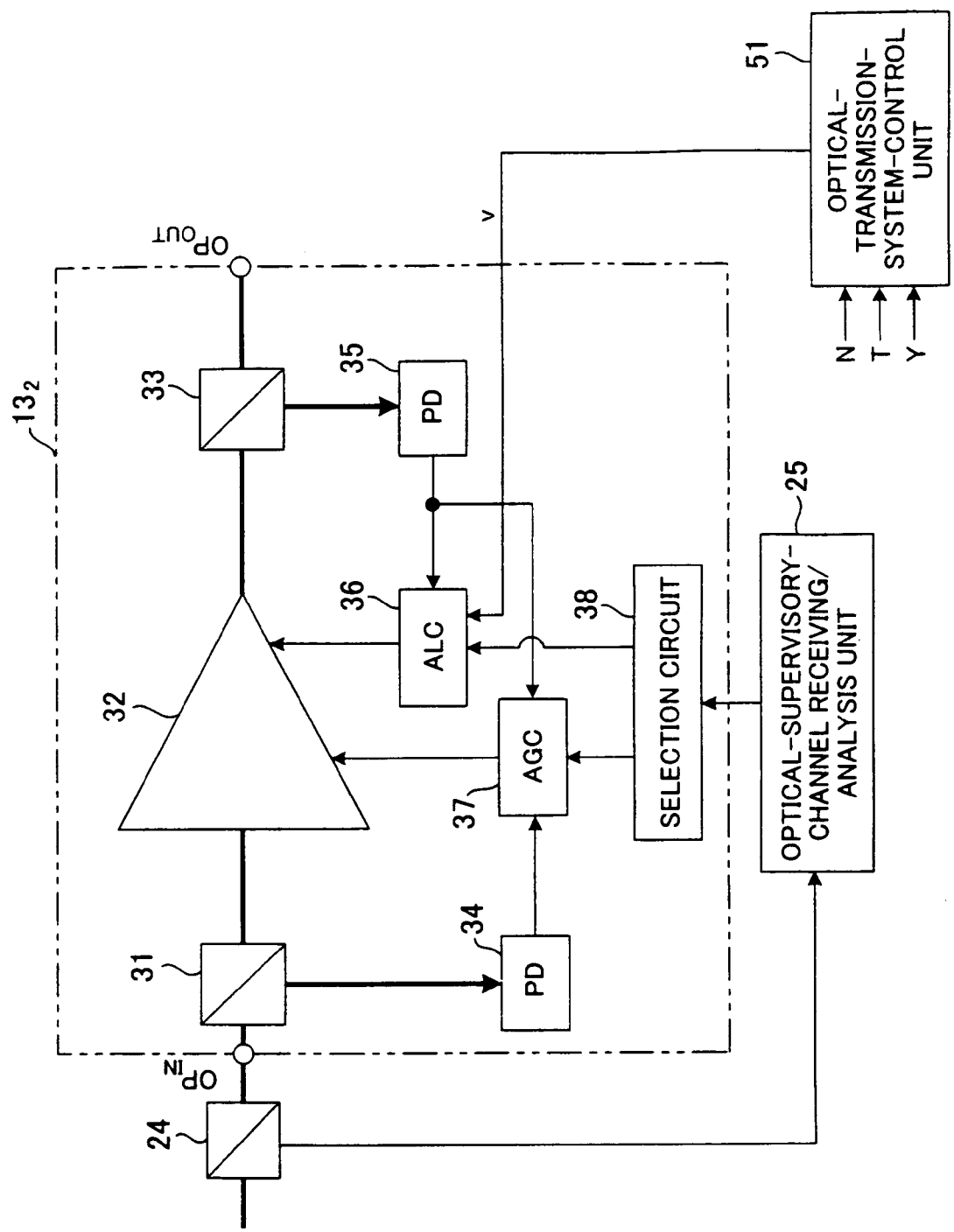
FIG. 12 shows an example of construction for controlling the output-level-recovery speed v of a pre amp.

FIG. 12 shows an example of construction for controlling the output-level-recovery speed v of the pre amp, where the pre am $13_2$ has nearly the same construction of that shown in FIG. 8.

The optical-transmission-system-control unit 51 decides the output-level-recovery speed v of the pre amp $13_2$ according to Equation (3), and sets that output-level-recovery speed v in the level-control unit 36 of the pre amp $13_2$. The level-control unit 36 controls the level-control cycle so that the level-recovery-speed v becomes the level-recovery speed as instructed from the optical-transmission-system-control unit 51. As a result, the pre amp $13_2$ is able to perform level control so that signal-transmission error does not occur when the number of channels changes.

Figure 13:
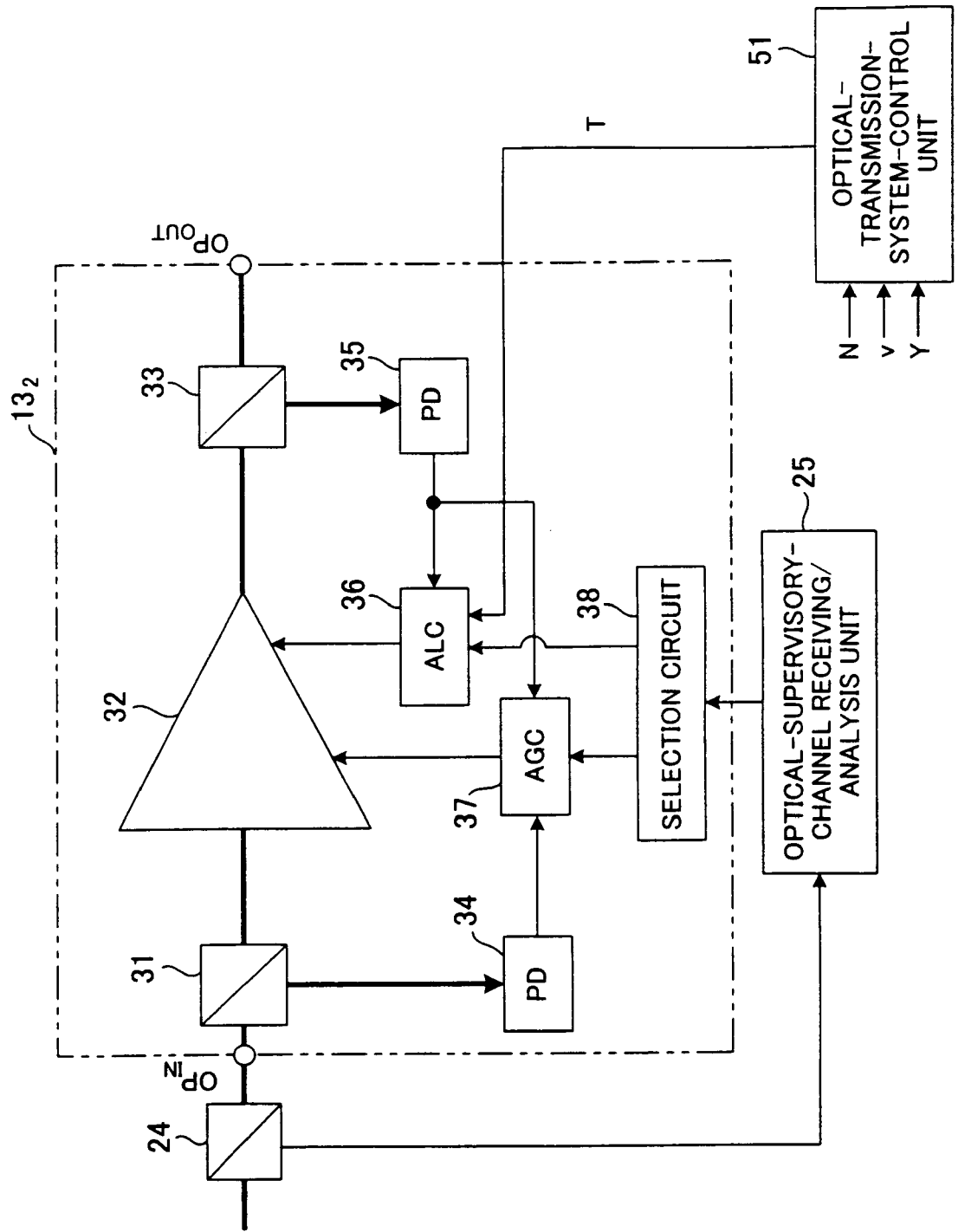
FIG. 13 shows an example of controlling a period T from the time when the number of multiplexed wavelengths changes until constant-gain control starts.
Figure 14:
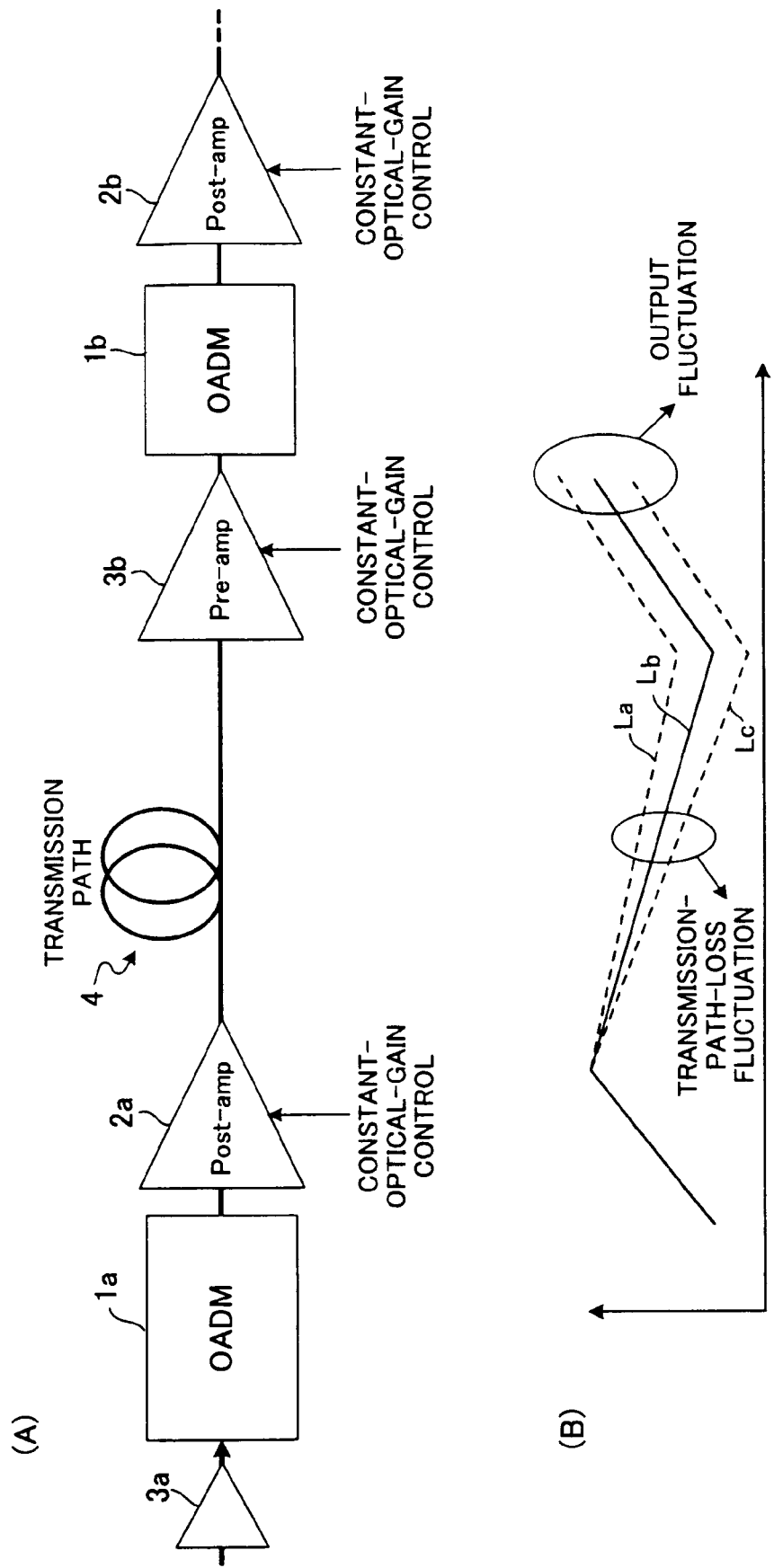
FIG. 14 is a drawing showing part of the mainline of a wavelength-division-multiplexing optical transmission system.
Figure 15:
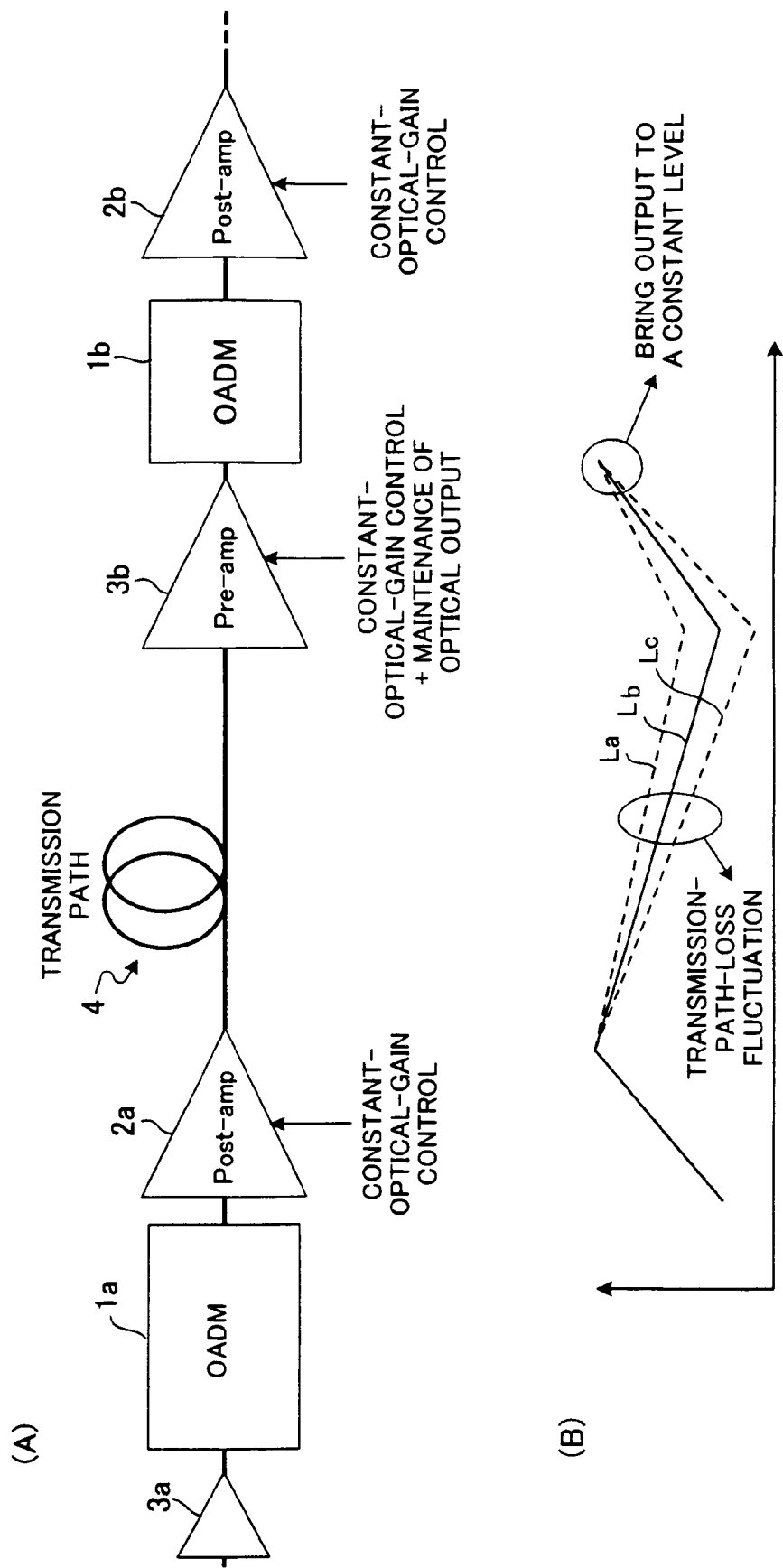
FIG. 15 is an example of an optical transmission system that has a constant-optical-gain-control function and constant-level-control function in a pre amp.

FIG. 13 shows an example of construction for controlling the period T from the time when the number of multiplexed wavelengths changes until constant-gain control starts, where the pre am $13_2$ has nearly the same construction of that shown in FIG. 8.

The optical-transmission-system-control unit 51 decides the period T from the time when the number of multiplexed wavelengths changes until constant-gain control starts according to Equation (2), and sets that period T in the selection circuit 38 of the pre amp $13_2$. The selection circuit 38 controls the switching time so that switching from level control to constant-gain control is executed at the time determined based upon the period T as instructed from the optical-transmission-system-control unit 51. As a result, the pre amp can perform both level control and constant-gain control so that signal-transmission error does not occur when the number of channels changes. The case of an optical-transmission-system-control unit 51 controlling the pre amp was described above, however, construction is also possible in which each unit of the optical-transmission system is controlled so that Equation (1) is satisfied.

As many apparently widely different embodiments of the present invention can be made without departing from the spirit and scope thereof, it is to be understood that the invention is not limited to the specific embodiments thereof except as defined in the appended claims.

What is claimed is:

1. A wavelength-division-multiplexing optical transmission system in which optical-node apparatuses that perform relay transmission of wavelength-division-multiplexed light are located at specified nodes, respectively, in a main optical transmission path, comprising at each respective specified node:
   a multiplexed-wavelength-number monitoring unit that monitors the number of multiplexed wavelengths;
   a multiplexed-wavelength-number transmission unit that transmits the number of multiplexed wavelengths in the downstream direction; and
   an optical amplifier that is located at a stage before the respective optical-node apparatus located at said respective specified node and that switches level control to constant-gain control when there is notification from upstream of a change in the number of multiplexed wavelengths, and after a specified amount of time, restarts level control so that the level becomes a target level that corresponds to the actual number of multiplexed wavelengths; and further comprising
   an optical-transmission-system-control unit that performs control so that the following equation $$T < Y/(N \cdot v)$$

is satisfied, wherein T (sec) denotes a period from the time when a change in the number of multiplexed wavelengths occurs until said constant-gain control starts, v (dB/sec) denotes output-level-recovery speed of said optical amplifier, Y (dB) denotes fluctuation allowance of a receiving unit after wavelength-division-multiplexing transmission, and N denotes a maximum number of spans.

2. The wavelength-division-multiplexing optical transmission system of claim 1 wherein
   said optical-transmission-system-control unit determines said period T based upon said output-level-recovery speed v of said optical amplifier, said fluctuation allowance Y of the receiving unit, and said maximum number of spans N.

3. The wavelength-division-multiplexing optical transmission system of claim 1 wherein
   said optical-transmission-system-control unit determines said output-level-recovery speed v of said optical amplifier based upon said period T from the time when a change in the number of multiplexed wavelengths occurs until said constant gain control starts, said fluctuation allowance Y of the receiving unit, and said maximum number of spans N.

4. The wavelength-division-multiplexing optical transmission system of claim 1 wherein
   said multiplexed-wavelength-number transmission unit uses a monitoring-signal light having a wavelength different from a main signal light to transmit the number of multiplexed wavelengths in the downstream direction.

5. The wavelength-division-multiplexing optical transmission system of claim 1 wherein
said multiplexed-wavelength-number transmission unit overlaps a low-frequency signal onto a main signal light, and uses that low-frequency signal to transmit the number of multiplexed wavelengths in the downstream direction.

6. The wavelength-division-multiplexing optical transmission system of claim 1 wherein
said multiplexed-wavelength-number monitoring unit is located inside said respective optical-node apparatus located at said respective specified node, and said multiplexed-wavelength-number transmission unit transmits the number of multiplexed wavelengths to said optical amplifier of a downstream node.

7. The wavelength-division-multiplexing optical transmission system of claim 1 wherein
another optical amplifier that performs constant-gain control is located at a stage after said respective optical-node apparatus located at said respective specified node, and said multiplexed-wavelength-number monitoring unit is located on the output side of said another optical amplifier, and said multiplexed-wavelength-number transmission unit transmits the number of multiplexed wavelengths to said optical amplifier of a downstream node.

8. The wavelength-division multiplexing optical transmission system of claim 1, wherein the respective optical-node apparatus located at said respective specified node is an optical add/drop multiplexer (OADM) that drops wavelengths from the number of multiplexed wavelengths monitored by the respective multiplexed-wavelength-number monitoring unit of said respective specified node, and the receiving unit receives the dropped wavelengths.

9. A control method for a wavelength-division-multiplexing optical transmission system in which optical-node apparatuses that perform relay transmission of wavelength-division-multiplexed light are located at specified nodes, respectively, in a main optical transmission path, the method comprising, for a respective specified node:
a step of monitoring a number of multiplexed wavelengths at said respective specified node;
a step of transmitting the number of multiplexed wavelengths in the downstream direction;
a step of switching level control to constant-gain control by an optical amplifier that is located at a stage before the respective optical node apparatus located at said respective specified node when there is notification from upstream of a change in the number of multiplexed wavelengths, and then after a specified amount of time, restarting level control so that the level becomes a target level that corresponds to the actual number of wavelengths;
a step of controlling the optical transmission system by an optical transmission system control unit so that the following equation $T < Y/(N \cdot v)$ is satisfied, wherein T (sec) denotes a period from the time when a change in the number of multiplexed wavelengths occurs until said constant-gain control starts, v (dB/sec) denotes output-level-recovery speed of said optical amplifier, Y (dB) denotes fluctuation allowance of a receiving unit after wavelength-division-multiplexing transmission, and N denotes a maximum number of spans.

10. The control method for a wavelength-division-multiplexing optical transmission system of claim 9 wherein
said period T is determined based upon said output-level-recovery speed v of said level control, said fluctuation allowance Y of the receiving unit, and said maximum number of spans N.

11. The control method for a wavelength-division-multiplexing optical transmission system of claim 9 wherein said output-level-recovery speed v of said level control is determined based upon said period T from the time when a change in the number of multiplexed wavelengths occurs until said constant gain control starts, said fluctuation allowance Y of the receiving unit, and said maximum number of spans N.

12. An apparatus comprising, for a respective node of a wavelength-division-multiplexed optical transmission system:
an optical add/drop multiplexer (OADM) receiving a wavelength division multiplexed (WDM) light and dropping wavelengths from the received WDM light, so that the dropped wavelengths are provided to a receiving unit;
an optical amplifier optically amplifying the WDM light before being received by the OADM, the optical amplifier
performing level control when a number of multiplexed wavelengths in the WDM signal is constant,
when receiving a notification from upstream of the respective node of a change in the number of multiplexed wavelengths in the WDM signal, switching from the level control to a constant-gain control, and
after a specified amount of time of the constant-gain control, switches back to the level control so that a level of the amplified WDM light becomes a target level corresponding to an actual number of multiplexed wavelengths in the WDM light; and
an optical-transmission-system-control unit that performs control so that the following equation is satisfied:

$T < Y/(N \cdot v)$ wherein T (sec) denotes a period from the time when a change in the number of multiplexed wavelengths in the WDM signal occurs until the constant-gain control is started by the optical amplifier, v (dB/sec) denotes output-level-recovery speed of the optical amplifier, Y (dB) denotes fluctuation allowance of the receiving unit, and N denotes a maximum number of spans.

* * * * *